3,446,625
**SYNTHETIC PULP FOR EDIBLE JUICES AND
METHOD OF MAKING SAME**
John Blethen, Rockland, Maine, assignor to Marine
Colloids, Inc., Springfield, N.J., a corporation of
Delaware
No Drawing. Filed June 4, 1965, Ser. No. 461,514
Int. Cl. A23l *1/04*
U.S. Cl. 99—105                                    30 Claims

ABSTRACT OF THE DISCLOSURE

A synthetic juice pulp is provided by coalescence accomplished by co-precipitation from or by drying a solution of a water soluble gum insolubilizable responsive to calcium cations or potassium cations or both, which solution has dispersed therein a modifying substance which may be a cold water soluble gum, a cold water insoluble cold water swellable gum or a non-swelling carbohydrate flour or soy bean flour, or a combination thereof. Insolubilization of the insolubilizable water soluble gum in the coalesced material is effected by calcium cations or potassium cations, or both, either during coalescence or when the pulp is used in making a synthetic juice.

---

This invention relates to foods and relates more especially to drinks which in whole or in part are synthetic and which simulate fruit or vegetable juices including the pulp content thereof. This invention is of especial applicability in connection with synthetic fruit juices which correspond in flavor and in color to the juices of citrus fruits such as oranges and grapefruit.

In recent years considerable progress has been made in the synthesis of juices and more especially the juices of the citrus fruits. However, the progress that has been made relates more especially to the simulation of the liquid portion of a natural juice as distinguished from the pulp portion.

In order to better match a juice as it naturally occurs, it also is necessary to simulate the pulp content. The pulp contributes to the appearance of the juice and also to mouth feel when the juice is being consumed. It is desirable, therefore, to provide in a synthetic juice a pulp-providing constituent in addition to the water soluble constituents which impart flavor, color and nutritional value.

While in the case of synthetic orange juice, for example, there is an ample available supply of orange pulp, nevertheless the commercial experience has been that natural orange pulp does not lend itself to being recovered for use in a synthetic orange juice. Natural orange pulp presents difficulties as regards the processing whereby it may be initially recovered and it is relatively uneconomical to do so. It also is perishable. Moreover, if the natural pulp is dried, difficulties have been encountered in that it does not satisfactorily reconstitute when placed in water and does not provide, when used in a synthetic orange juice, a pulp that is acceptable as regards appearance and mouth feel. Under the circumstances, it is commercially desirable to provide some source other than recovered natural pulp for supplying the pulp content of a synthetic juice.

Heretofore attempts have been made to furnish synthetic citrus juice preparations containing constituents intended to simulate natural pulp as it occurs in a freshly prepared natural juice. However, the materials which have been selected for this purpose have decided drawbacks due principally to unsatisfactory consistency. Thus, one of the principal difficulties of synthetically produced pulps has been that of an excessively mushy or slimy consistency which detracts from the acceptability of the synthetic juice not only from the point of view of the unnatural appearance of the synthetic pulp but also from the point of view of mouth feel.

At the present time frozen concentrated fruit juices are very popular. Such concentrates when diluted contain the natural pulp of the juice. Synthetic fruit juice preparations have been placed on the market in the form of a frozen concentrate and in certain commercial products of this type a synthetic pulp component has been included. However, the pulp that has been used has had the shortcomings which have been mentioned above. Another type of synthetic fruit juice is sold commercially in the form of a dry particulate material, the particles being readily soluble in water to provide a simulated juice. In this type of commercial product synthetic pulp is not included, presumably because of the unavailability of a synthetic pulp capable of rapid hydration from the dry state to form simulated pulp particles when the dry composition is added to water.

It is an object of this invention to provide a synthetic pulp which closely simulates the appearance, texture and mouth feel of the pulp content of a natural juice, e.g., a citrus fruit juice. It is a further object of this invention to provide a synthetic pulp which may be economically and readily prepared, which is not perishable and which remains in a stable condition in the synthetic fruit juice. It is a further object of this invention to provide a synthetic pulp which may be prepared in a dry particulate form and which is capable of rapid hydration. According to preferred practice of this invention, the hydration may be effected in only 20 to 30 seconds.

In accordance with this invention, a synthetic pulp having desirable characteristics is prepared by providing a plurality of components which are caused to occur in intimately coalesced relation as by coprecipitation from an aqueous dispersion of the components or by producing such a dispersion and reducing it to dryness as by the use of a drum dryer.

An essential ingredient of the pulp is an acid-tolerant water soluble gum that is insolubilizable responsive to a bromatological metal occurring as a cation. When reference is made to the metal or other component of the composition as being "bromatological," the reference is to the metal or other component as being acceptable for human consumption in a food such as a fruit juice or a synthetic fruit juice. Obviously the components of the synthetic pulp, if they are to be edible, must be nontoxic. When reference is made to the gum or other constituent of the pulp as being "acid-tolerant," the reference is to stability in the presence of the amount of acid conventionally found in a synthetic fruit juice under the conditions encountered during preparation, storage and ultimate consumption. In most citrus juices the pH is of the order of 3 to 3.5 and even under unusual conditions would not be less than about 2.2. Most natural or synthetic fruit juices are acidic and have a pH between about 2.2 and about 3.5. A vegetable juice, e.g., tomato juice, may have a pH of the order of 4.2 to 4.4. For a synthetic citrus fruit juice the pH may be of the order of 3 to 3.5 or possibly as low as about 2.2. For other synthetic juices the pH may be from about 3.0 to about 3.5.

The preferred water soluble gum that is employed in the practice of this invention is algin, which is the gum or mucilaginous material contained in seaweed species such as Laminaria, Phaeophyceae, Macrocystis, Nereocystis, and the like. Algin is recoverable by extraction from such seaweeds using water at an elevated temperature and at a slightly alkaline pH provided by an alkaline material such as sodium hydroxide or sodium carbonate. The dissolved algin may be separated from the seaweed cellulose by filtration and may be recovered either by evaporation of the solution or by precipitation effected by the addition of a hydrophilic alcohol such as isopropyl alcohol. As recovered in the extracting solution, the gum is in the form of a water soluble salt, usually sodium alginate. As contrasted with a soluble alkali metal salt of algin, the calcium salt is insoluble in water. For example, when there is added to a solution of sodium alginate a soluble compound of calcium, insoluble calcium alginate will precipitate from solution. Algin also may be insolubilized by the acidification of a water solution of an alkali metal salt of algin. Algin is notable for its capacity to provide water solutions of high viscosity at low concentrations. Since its utility in this regard can be varied according to the manner of its recovery, different algins commonly are classified in terms of viscosity measured in centipoises of a 1% water solution at 25° C. using a Brookfield viscosimeter operated at 60 r.p.m. However, the present invention utilizes a different property, namely, its property in response to precipitation with calcium to provide special physical properties when the algin has been coalesced with a modifying substance in accordance with the invention herein disclosed, which properties are of unique value in providing a desirable synthetic pulp formulation in synthetic fruit juice.

A synthetic juice such as synthetic orange juice usually contains a substantial amount of calcium contributed by a soluble calcium salt, the concentration of calcium in the case of a frozen concentrate being of the order of 0.16% to 0.36% by weight based on the concentrate. If algin in the soluble alkali metal salt form is incorporated in such a synthetic juice the combined effect of calcium cations and the acid pH converts the algin to insoluble calcium alginate. Of course, if insoluble calcium alginate is initially added to the juice which contains the calcium cations, the algin will remain as calcium alginate. In either case, the resulting particles, while capable of substantial swelling, tend to become too tough to be commercially acceptable in a synthetic juice. The action of the calcium cations contained in the synthetic juice is believed to be responsible for the toughening of the algin particles.

While the toughening action of the calcium cation in the synthetic juice has the disadvantage above mentioned, it has been found, according to this invention, that this property of a gum such as algin may be taken advantage of in the production of a desirable synthetic juice pulp by causing algin to coalesce with a modifying substance. The solubility of algin is taken advantage of to accomplish intimate commingling of the algin and the modifying substance while the algin is dissolved in an aqueous solution thereof. The modifying substance may be dispersed in the algin solution either in the form of a solid when the modifying substance is insoluble in the aqueous solution or in the form of a solution when the modifying substance is soluble in the aqueous solution. The dissolved algin is then converted to the solid state and by virtue of its occurrence intermingled with the modifying substance, the modifying substance is caused to become coalesced therewith as by coprecipitation or by evaporation of the solution to dryness. The algin also is rendered insoluble responsive to cationically dispersed calcium either simultaneously with the coalescence of the algin with the modifying substance or at some subsequent time so as to be insolubilized when the artificial pulp occurs in the juice or in an aqueous juice concentrate. The modifying substance coalesced with the algin also is essentially insoluble in the juice or in an aqueous juice concentrate.

Algin is referred to herein and in the claims as a water soluble gum in that there is a form thereof, as exemplified by sodium alginate, that is water soluble. Such gums are referred to herein and in the claims as water soluble gums insolubilizable by calcium, or by potassium in the case of a water soluble gum insolubilizable by potassium, whether the gum is in the soluble form, as for example, sodium alginate, or is in the insoluble form, as for example, calcium alginate, unless there is more specific reference to the gum as being in solution or as being in the insolubilized condition.

While algin is the water soluble gum that preferably is employed in the practice of this invention, another calcium insolubilizable gum that possesses properties analogous to those of algin for the purposes herein contemplated is pectin or, more generally, a pectic substance. In the case of both algin and pectic substances, the insolubilization is due to the presence of sufficient carboxyl functions responsive to calcium to result in insolubilization. Accordingly, algin may be used in a partially esterified form, such as propylene glycol alginate, provided sufficient carboxyl functions are present to result in insolubilization responsive to calcium cations, and the term "algin" as used herein and in the claims is to be understood as embracing algin, either as initially recovered or as further treated, provided it is such as to occur in a water soluble form and also is calcium-sensitive whereby it may be rendered insoluble. Similarly, the term "pectic substance" as used herein and in the claims is to be understood as including pectin, treated pectins, pectic acid, pectic acid partial esters and the like which have a water soluble form and also are calcium-sensitive so as to be rendered insoluble in the juice or aqueous juice concentrate.

The modifying substance that preferably is employed in the practice of this invention in the case of a synthetic juice product in dry particulate form is a substantially cold water insoluble cold water swelling gum. Such gums are exemplified by karaya gum, tragacanth gum, locust bean gum, tamarind gum, agar and lime extracted *Eucheuma spinosum* gum, namely, the extractive obtained from *Eucheuma spinosum* when the extraction is carried out at an elevated temperature in an aqueous medium containing from about 3.7% to 15.0% by weight of lime. While starch as it normally occurs is substantially non-swelling, if the starch is subjected to heat in an aqueous medium it becomes wholly or partially gelatinized so as to acquire pronounced cold water swelling properties while remaining substantially cold water insoluble, and wholly or partially gelatinized starch is a substantially cold water insoluble cold water swelling gum that is preferably employed in the practice of this invention. Wheat flour which normally is non-swelling in cold water is similar to starch in that in the gelatinized or partially gelatinized condition it possesses desirable cold water swelling properties. When reference is made to gelatinized starch or gelatinized wheat flour the reference is to the starch or wheat flour in the wholly or partially gelatinized condition which possesses substantial cold water swelling properties. These gums are acid-tolerant and are insensitive to calcium in the sense that their physical properties remain substantially unchanged by the presence of calcium or other metal used for insolubilizing the water soluble gum. Any substantially cold water insoluble cold water swelling gum may be employed.

In the case of a synthetic juice product that occurs in the form of a frozen aqueous concentrate it is preferable to employ as the modifying substance an acid-tolerant calcium-insensitive water soluble gum. While any such gum may be employed, those which preferably are employed are exemplified by soluble carrageenan, degraded amylopectin and carboxymethyl cellulose. A suitable form of soluble degraded amylopectin is sold under the trade name "Kolsol." Other suitable water soluble gums are guar, gum acacia and methylcellulose.

There also may be included as a modifying substance for the calcium insolubilized algin or pectic substance a bromatological substantially water insoluble flour. Such flours exercise their modifying effect by reason of their insoluble, finely particulate nature as distinguished from the gelatinous characteristics of the water insoluble cold water swelling gums and the water soluble gums. The edible ungelatinized carbohydrate flours are especially suitable as, for example, ordinary (ungelatinized) starch or wheat flour. Cellulose flour also may be employed such as wood flour or crystalline cellulose. Another suitable flour is soy bean flour. These flours are acid-tolerant and their properties remain substantially unchanged in the presence of calcium or other metal used for insolubilizing the water soluble gum.

Certain water soluble gums are sensitive to insolubilization responsive to cationically dispersed potassium. The employment of a calcium-sensitive water soluble gum normally is preferable because the calcium-sensitive water soluble gums have preferable physical properties when insolubilized. Moreover, advantage can be taken of the usual calcium content of synthetic juices, such as synthetic citrus fruit juices, for providing the insolubilizing effect. However, a bromatological soluble compound of potassium may be included in a synthetic juice instead of or in addition to a bromatological soluble compound of calcium. Potassium insolubilizable water soluble gums are illustrated by kappa carrageenan, hypnea and furcellaria. Carrageenan as conventionally extracted from sea plants such as *Chondrus crispus* (Irish moss), *Chondrus ocellatus, Eucheuma cottonii, Eucheuma spinosum, Gigartina acicularis, Gigartina pistillata, Gigartina radula* and *Gigartina stellata* contains two forms of carrageenan, namely, kappa carrageenan and lambda carrageenan, in roughly equal proportions. It is the kappa carrageenan which is insolubilizable responsive to the potassium cation. While the whole carrageenan may be employed, it is preferable to employ kappa carrageenan from which most of the lambda carrageenan has been separated. However, when reference is made herein and in the claims to kappa carrageenan the reference is to kappa carrageenan either as it occurs in whole carrageenan together with lambda carrageenan or in a more concentrated form from which lambda carrageenan has been separated in whole or in part.

The potassium insolubilizable gums when insolubilized responsive to potassium cations are substantially different in physical consistency as compared with either algin or a pectic substance that has been insolubilized by calcium, in that the potassium insolubilized gum is softer and more fibrous and likewise possesses cold water swelling properties which enable such gums to take the place in whole or in part of a cold water insoluble cold water swelling gum for use as a modifying substance in coalesced relation with a calcium insolubilized algin or a calcium insolubilized pectic substance. In the case of carrageenan, for example, it may be used as a water soluble gum to modify the insolubilized algin or pectic substance when the properties imparted by a water soluble gum are desired. However, when the properties imparted by a cold water insoluble cold water swelling gum are desired, sufficient potassium may be caused to be present to insolubilize the carrageenan. For such uses the coalescence from water solution can be readily accomplished since both the calcium insolubilizable gums and the potassium insolubilizable gums can be initially dissolved while in water soluble form and coalescence can be accomplished either by drying or coprecipitation. However, it is apparent that in the final juice composition, or whenever the particulate pulp composition may otherwise occur in an aqueous medium, there must be potassium present to insolubilize the potassium insolubilizable gum as well as calcium to insolubilize the calcium insolubilizable gum if the potassium insolubilizable gum is desired in the insolubilized state. While the potassium insolubilizable gums may be affected to a certain extent by calcium, they are primarily responsive to potassium, and their properties as regards being relatively soft and cold water swelling are not substantially altered by the presence of calcium cations in an amount effective to insolubilize algin or a pectic substance.

The utility of a potassium insolubilizable water soluble gum is not limited to that of a cold water swelling gum in combination with calcium insolubilized algin or a calcium insolubilized pectic substance. Since the potassium insolubilizable gums have the property of occurring in water soluble form and can be converted to insolubilized form, advantage can be taken of these properties in effecting coalescence of a potassium insolubilizable gum with a modifying substance. The potassium insolubilizable gums when in the insolubilized condition being relatively soft, it is particularly advantageous to use therewith as a modifying substance a bromatological water insoluble flour of the character aforesaid as illustrated by carbohydrate flours and soy bean flour. It is consistent with this invention to employ one of the cold water insoluble cold water swelling gums in combination with a potassium insolubilizable gum but this is not normal practice since both are relatively soft and gelatinous and possess cold water swelling properties. It is of particular advantage for such gums to employ as a modifier an insoluble non-swelling modifying substance of the flour type as described above in connection with the use of carbohydrate flours and soy bean flour.

In the case of calcium insolubilized algin and pectic substances the non-swelling flours normally are not employed as the sole modifying substance since the resulting particles have a somewhat harder consistency than that which conforms to the personal taste of the average consumer. However, when calcium insolubilized algin or a calcium insolubilized pectic substance is employed in conjunction with a cold water insoluble cold water swelling gum or with a potassium insolubilized water soluble gum as disclosed hereinabove, then it normally constitutes preferred practice of the invention to also include in the synthetic juice pulp a substantial quantity of a carbohydrate flour or soy bean flour in intimately coalesced relation therewith.

When the coalescence of the insolubilizable water soluble gum and the modifying substance is accomplished by evaporation of water so as to leave the coalesced solids, the evaporation of the water can be accomplished in any suitable way. In practice, it has been found that the evaporation can be preferably accomplished on the surface of a heated drum or roll, the surface of which is maintained at a temperature of the order of 325° C. to 350° C. Roll drying is especially desirable when the modifying substance comprises a substantially water insoluble non-swelling flour or a substance such as starch which coalesces with the water soluble gum to form particles of desired consistency and which, when exposed to heat on the drying roll, will become gelatinized so as to function as a cold water swelling gum.

Synthetic fruit pulp particles which have been roll dried or otherwise formed by evaporation of water hydrate readily when reintroduced into an aqueous medium in a juice or juice concentrate. When added to the aqueous medium of a juice or juice concentrate containing calcium or potassium, or both, depending on the water insolubilizable gum comprised in the pulp particles, the gum becomes insolubilized in the form of stable pulp particles. Of course, if the pulp already is in the insolubilized state when added to the aqueous medium of the juice or juice concentrate, the presence of the insolubilizing cation in the aqueous medium serves to preserve the pulp particles in the insoluble condition.

Coalescence of the water soluble gum with the modifying substance preferably is accomplished by coprecipitation especially when most of the modifying substance is a water insoluble cold water swelling gum or a water soluble gum or when a potassium insolubilizable water soluble gum is used as the modifying substance in combination with algin or a pectic substance. However, coprecipitation also may be employed when the modifying substance is a water insoluble non-swelling flour and "coprecipitation," as used herein and in the claims, is to be understood as including the occlusion with the precipitated water soluble gum of a water insoluble flour or gum which is carried down with the precipitated gum. When the modifying substance is starch, the coprecipitation technique should be employed rather than roll drying at elevated temperatures if it is desired that the starch remain ungelatinized.

Coprecipitation may be effected by adding the aqueous solution of the water soluble gum containing the modifying substance to be coalesced therewith to a hydrophilic alcohol or other volatile hydrophilic liquid such as acetone. Preferably isopropanol is employed for this purpose, although other hydrophilic alcohols may be employed such as methanol, ethanol and propanol. Enough hydrophilic alcohol is used to effect the coagulation. Usually about 82 to 124 parts by weight of 85% propanol per 100 parts by weight of gum solution is sufficient for the purpose. While the alcohol effects precipitation of the water soluble gum, it is important in order to obtain the best pulp properties that there be included in the alcohol an insolubilizing amount of calcium or potassium, or both, depending on the cation sensitivity of the gum or gums that are present. In order to have desired effectiveness in this regard the soluble compound of calcium or potassium should be at least about 20% by weight of dry weight of the whole pulp. Greater amounts may be employed but are unnecessary. The presence of the insolubilizing cation results in a more filmy texture which is preferable for use as a synthetic juice pulp. When algin or a pectic substance is employed together with a potassium-sensitive water soluble gum, the inclusion in the alcohol of a soluble calcium compound is sufficient and it is not essential also to include a soluble potassium compound. Any bromatological soluble compound of calcium or potassiu mmay be employed such as the chloride, citrate, acetate or adipate. Normally the chloride is used.

When the pulp is produced by coprecipitation, the rate of rehydration of the pulp particles after drying can be improved by dehydrating the pulp with the hydrophilic alcohol after the coprecipitated pulp particles have been separated from the residual solution. This can be accomplished by first partially dehydrating the pulp particles using, for example, isopropanol or other alcohol of about 85% concentration and finally washing the particles with isopropanol or other alcohol of about 85% to 99% concentration. For commercial purposes it is desirable to effect such washing to dehydrate the particles until a removed and dried sample can be rehydrated in about 20–30 seconds when placed in the type of juice in which it is to be used, e.g., synthetic orange juice.

While it is much preferred to accomplish coprecipitation by adding the solution to a hydrophilic alcohol, the precipitation of the water soluble gum may be accomplished by inclusion in the solution containing the water soluble gum of a soluble compound of the cation that insolubilizes the gum. If both a calcium insolubilizable gum and a potassium insolubilizable gum are contained in the solution, it is necessary, in order to prevent loss of gum, to include in the solution both calcium and potassium cations in effective amount to insolubilize each of the gums, respectively. After coprecipitation is effected in this manner and separation of the precipitate from the residual solution, the precipitated gum should be washed with a hydrophilic alcohol in order to dehydrate the precipitate in this way and thereby render it more susceptible of rehydration.

The shape of the coalesced pulp particles is effected by the manner of their preparation. When produced using a roll dryer, the particles tend to be flake-like and the desired size range may be obtained as by milling and selective screening. When produced by coprecipitation, the particles tend to be fibrous and the size and nature of the fibrous precipitate may be initially adjusted by controlled agitation. After recovery, the fibers may be selectively screened. In order to obtain a more random pulp appearance, the particles prepared using a drum dryer may be mixed with other particles produced by coprecipitation and this constitutes preferred practice of the invention. For synthetic citrus juices dry pulp particles which pass a 10-mesh screen and which are retained on a 40-mesh screen provide a natural appearance.

The synthetic pulps prepared as above described are especially suitable for incorporation in a synthetic juice preparation that occurs in dry particulate form, the pulp being especially suitable for rapid hydration from the dry state to a natural-appearing pulp when the dry preparation is added to water. In the case of synthetic juice preparations in the form of an aqueous concentrate, the pulp already occurs in the hydrated condition and upon dilution of the concentrate it has been found according to one of the features of this invention that more rapid liberation of the pulp particles from the soluble solids in the concentrate so as to quickly assume a natural appearance in the diluted juice may be realized by preparing the pulp particles in a special manner, namely, by causing the coalescence to occur by film coprecipitation.

In producing the pulp particles by film coprecipitation a thin film of the dissolved insolubilizable gum and modifying substance is formed on a suitable carrying surface such as a drum or belt, and while being so carried the film is contacted with a coagulating solution of the character hereinabove described for accomplishing coprecipitation. For example, 85% isopropanol or other hydrophilic liquid containing calcium chloride may be used or an aqueous solution of calcium chloride. It has been found that when film coating is caused to contact the coagulating liquid, it initially becomes converted to a soft film that continues to solidify as the result of the continued coagulating effect of the calcium and of the hydrophilic liquid. The film thus produced can readily be cut into desired pulp particle size while on the drum surface and then removed by a doctor blade. After removal the particles may be dehydrated as hereinabove described using isopropanol or other dehydrating liquid and thereafter dried.

In carrying out film coprecipitation the thickness of the pulp particles can be controlled by adjusting the concentration and thickness of the film coating. By forming thin pulp particles in this way the physical properties are rendered especially suitable for rapid transition from their condition in a juice concentrate to natural-appearing pulp in the diluted juice. The formation of pulp particles by film coprecipitation also facilitates the production of particles of desired size and shape simulating natural pulp particles.

It also is desirable that the synthetic pulp be capable of becoming colored corresponding to the color of the synthetic juice. It is desirable, therefore, to include in the synthetic pulp a substance which is receptive of color. It has been found that a proteinaceous material is suitable for this purpose. Since a certain amount of protein normally is found in locust bean gum, possibly as an impurity, the inclusion of a color-receptive gum may be exemplified by the use of locust bean gum. Another similar proteinaceous cold water insoluble cold water swelling gum is tamarind gum. Alternatively, a small amount of casein may be included in the pulp. Soy bean flour likewise contains a relatively large proportion of protein.

The relative proportions are subject to wide variation depending on the properties desired in the pulp, the particular constituents which are selected and the constituents of the juice in which the pulp is employed, for the toughening tendency of the insolubilizable gums is enhanced as the concentration of the insolubilizing cation is increased in the synthetic juice. Thus when using algin, or a pectic substance, in combination with a cold water swelling gum such as gelatinized starch the algin or pectic substance usually constitutes at least about 5% to about 20% of the dry weight of the pulp although higher percentages of algin may be used. Since the water swelling properties of cold water swelling gums differ somewhat from each other, different amounts may be used. For example, in the case of karaya gum, which tends to swell more than gelatinized starch, the ratio thereof to insolubilized algin or an insolubilized pectic substance ordinarily is somewhat less than when gelatinized starch is used as the cold water swelling gum. This also applies to potassium insolubilized water soluble gums when used for their water swelling properties in combination with calcium insolubilized algin or a calcium insolubilized pectic substance. Somewhat more generally, the algin or pectic substance may range from about 5% to 90% of the dry weight of the synthetic pulp although in ordinary practice the insolubilized algin or insolubilized pectic substance is not more than 75% and preferably is not more than about 50% of the dry weight of the pulp.

The content of the synthetic pulp other than the insolubilized algin or insolubilized pectic acid may consist entirely of a substantially cold water insoluble cold water swelling gum or a potassium insolubilized water soluble gum, or a water soluble gum, or a combination of said gums. However, a modifying substance of the insoluble flour type may be employed but, for obtaining a pulp having a natural softness as well as firmness, the pulp should consist of at least about 25%, preferably at least 90%, by dry weight of a cold water swelling gum or a potassium insolubilized water soluble gum or a water soluble gum when a water insoluble flour is employed in the finished pulp.

When a potassium insolubilizable water soluble gum is employed as the sole insolubilizable water soluble gum component of the pulp, the proportion thereof may be from about 5% to 90% of the pulp although, being somewhat softer than calcium insolubilized algin or a calcium insolubilized pectic substance, the proportion thereof usually is larger. Moreover, the physical characteristics thereof are such that the water insoluble non-swelling flours have a desirable modifying effect either with or without the further presence of a substantially cold water insoluble cold water swelling gum or a water soluble gum.

As illustrative of the proportions that are employed, the following is typical of preferred formulation for the synthetic pulp component of a synthetic juice preparation in solid particulate form, the parts here and elsewhere herein being parts by weight:

| | Parts |
|---|---|
| Algin | 2–5 |
| Locust bean gum | 2–5 |
| Gelatinized starch | 20 |

The foregoing typical formulation may be caused to become coalesced and intimately commingled in particles of appropriate size for a citrus fruit pulp, for example, either by evaporation or by coprecipitation, although a citrus fruit pulp having especially desirable physical properties may be produced by blending about 1 part of pulp produced by coprecipitation with about 1 part of pulp produced by roll drying.

The following are representative examples of the practice of this invention.

EXAMPLE 1

Algin, starch, locust bean gum—roll dried 20 parts of substantially non-swelling potato starch, 1.5 parts of 50-centipoise soluble algin (sodium alginate) and 2 parts of finely divided locust bean gum are blended dry and then mixed with 294 parts of water. The algin dissolves in the water and the starch and locust bean gum become dispersed in the algin solution, the gum particles becoming greatly swollen. The resulting aqueous mixture is coalesced to a solid particulate form by roll drying and the dried material is treated so as to recover as the desired product particles passing a 10-mesh sieve and retained on a 40-mesh sieve. The particles are flake-like and when added to an acidic calcium-containing synthetic juice the algin is insolubilized and the flakes hydrate quickly to form a stable, natural-appearing pulp. The pulp particles do not become objectionably tough as is the case if the insolubilized algin were to be employed without having been coalesced with the starch. By reason of the inclusion of the locust bean gum the synthetic color employed in the juice is taken up by the synthetic pulp so that the pulp particles acquire a natural color.

EXAMPLE 2

Algin, starch, locust bean gum—coprecipitated 20 parts of potato starch, 5 parts of 50-centipoise soluble algin and 2 parts of locust bean gum are blended with each other in a dry condition. The dry blend is introduced into 1350 parts of water and the resulting mixture containing dissolved algin is brought to 90–100° C. in order to rupture the starch granules and thereby convert the starch to a cold water swelling gelatinized gum. The hot paste is poured slowly into 1060 parts by weight of 80–85% isopropyl alcohol containing 10 parts of $CaCl_2 \cdot 2H_2O$ which results in coprecipitation and insolubilization of the algin. The resulting mixture is subjected to mechanical agitation appropriate for breaking up the coprecipitate into lengths appropriate for orange pulp, namely, lengths of the order of ¼" to ½". After the short fibers have thus been produced, the liquid is drained off and replaced by 530 parts of 80–85% isopropyl alcohol in which the short fibers are held for 15 minutes while subjecting the mixture to mild agitation. The liquid is again removed and replaced by 200 parts of 99% isopropyl alcohol in which the pulp is permitted to dehydrate for from 10 to 15 minutes. At this time a portion of the pulp may be tested for hydration time by drying it and introducing it into the synthetic juice with which it is to be used. As a commercial standard, it is desirable that the particles will become hydrated in a period of 20–30 seconds. If the hydration rate is not sufficiently rapid the dehydration is continued. If the dried pulp meets the hydration rate test, the pulp is then drained as free as possible of alcohol and is dried at a temperature between about 60° C. and about 80° C. in atmosphere subjected to forced circulation. There is recovered from the dried pulp those particles which pass a 10-mesh sieve and are retained on a 40-mesh sieve. The thus recovered particles contain cold water swelling gelatinized starch coalesced with the insoluble calcium alginate and when added to a synthetic citrus fruit juice become hydrated in the presence of calcium citrate at an acid pH to produce a stable pulp which in appearance and consistency closely resembles citrus pulp.

Ordinary starch can be converted by heat while in an aqueous dispersion to a gelatinized form which constitutes a cold water swelling gum in the pulp. Modified starches are on the market which exhibit cold water swelling properties. If such a starch is used, then it is not necessary in carrying out the steps of this example to subject the aqueous mixture to the heating step.

EXAMPLE 3

Pectic acid, starch, locust bean gum—coprecipitated

A dry blend is prepared consisting of 20 parts of a potato starch, 2 parts of neutralized pectic acid and 2 parts of locust bean gum. The dry mixture is blended with 600 parts of water to form a paste in which the neutralized pectic acid is dissolved and which is heated to 90–100° C. to gelatinize the starch. The paste is poured slowly into 1070 parts of 80–85% isopropyl alcohol containing 10 parts of $CaCl_2 \cdot 2H_2O$. A coprecipitate is formed and the mixture is stirred so as to produce fibers which are predominantly ¼" to ½" in length. After standing for a period of from one-half to one hour to permit a full development of the insolubilization of the neutralized pectic acid in response to the calcium cations contained in the liquid, the pulp is separated from the liquid and is washed with 99% isopropyl alcohol to remove water. The dehydration washes are continued until a sample upon drying rehydrates in about 20–30 seconds when added to a synthetic orange juice. After the dehydration

EXAMPLE 4

Pectic acid, starch—roll dried 20 parts of cold water non-swelling potato starch is made into a slurry with 825 parts of water containing 5 parts of pectic acid which has been neutralized to a pH of 7 with sodium carbonate. The slurry is dried by roll drying and the dried material is broken up into particulate form and those particles are recovered which pass a 10-mesh sieve and are retained on a 40-mesh sieve. The flakes thus produced hydrate well in synthetic orange juice to form a stable, natural-appearing pulp. The stability of the pulp is developed in the juice itself as the result of the insolubilizing effect of the calcium content of the synthetic orange juice as well as the acid pH of the synthetic orange juice.

EXAMPLE 5

Low methoxylated pectin, starch—coprecipitated 20 parts of ordinary potato starch and 10 parts of low methoxylated pectin are blended in 750 parts of water which is heated to a temperature between 90–100° C. to produce a mixture of paste-like consistency wherein the starch is gelatinized. The mixture is poured slowly into 1070 parts by weight of 80–85% isopropyl alcohol containing 10 parts by weight of $CaCl_2 \cdot 2H_2O$, thereby insolubilizing the methoxylated pectin with resultant formation of a coprecipitate. The resulting precipitated pulp is subjected to mild agitation for breaking up the fibrous coprecipitate into pieces about ¼″ to ½″ in length. The liquor is then drained off and is replaced by 200 parts of 99% isopropyl alcohol in which the pulp is permitted to soak for about 15 minutes or until a removed dried sample is found when placed in a synthetic orange juice to hydrate in about 20–30 seconds. When the pulp has become sufficiently dried for meeting this test, the pulp is recovered and dried and is classified for the recovery of particles passing a 10-mesh sieve and retained on a 40-mesh sieve. The resulting particles when added to a synthetic orange juice produce a stable, natural-appearing pulp.

EXAMPLE 6

Low methoxylated pectin, starch—roll dried 20 parts of ordinary potato starch and 10 parts of low methoxylated pectin are dispersed in 750 parts of water to form an aqueous mixture of pasty consistency. The mixture is reduced to a solid state by roll drying and the dried material is subjected to mechanical milling so as to occur in the size range passing a 10-mesh sieve and retained on a 40-mesh sieve.

EXAMPLE 7

Algin, karaya gum, cellulose powder—coprecipitated 5 parts of karaya gum, 5 parts of cellulose powder and 2 parts of 50-centipoise algin are made into a 1% aqueous paste wherein the algin is dissolved, the karaya gum is greatly swollen by absorption of water and the cellulose powder remains in a substantially non-swollen condition. The paste is poured into 1 volume of 99% isoproply alcohol which contains 2.4 parts of $CaCl_2 \cdot 2H_2O$ that has been added to the alcohol in the form of an aqueous concentrate. The resulting coprecipitate is broken into pulp particles by mechanical agitation. The resulting particulate pulp is further dehydrated using 99% isopropyl alcohol and thereafter is dried and classified so as to recover particles passing a 10-mesh sieve and retained on a 40-mesh sieve.

EXAMPLE 8

Algin, pre-gelatinized starch, cellulose powder, casein—coprecipitated 2 parts of 50-centipoise algin, 5 parts of cellulose powder and 5 parts of pre-gelatinized starch and 0.5 part of casein are made up into an aqueous 1% paste which is coagulated by addition to 1 volume of isopropyl alcohol containing 2 parts of $CaCl_2 \cdot 2H_2O$ and the resulting coprecipitate is agitated sufficiently to reduce it to a particulate condition. The resulting pulp is separated from the liquor and is dehydrated with 99% isopropyl alcohol. The resulting dried particles are recovered in the size range passing a 10-mesh sieve and retained on a 40-mesh sieve. The particles so produced hydrate well in a synthetic orange drink and there is a noticeable adsorption of color by the particles, the color adsorption being augmented by the presence of the casein.

EXAMPLE 9

Algin, karaya gum—coprecipitated 10 parts of karaya gum and 3 parts of 50-centipoise algin are blended with 1000 mls. of water to form an aqueous mixture of pasty consistency wherein the algin is dissolved and the karaya gum acquires a gelatinous swollen condition. The mixture while cold is coagulated by adding it to 1000 mls. of 99% isopropyl alcohol which contains 2 gms. of $CaCl_2 \cdot 2H_2O$ which had been added to the alcohol in the form of a concentrated solution. The resulting coprecipitate is fibrous and is broken up into short lengths by mechanical agitation. The resulting pulp is separated from the residual liquor and is dried using 99% isopropyl alcohol until the dried material hydrates within 30 seconds when placed in a synthetic orange juice. The dried material is recovered in a size range passing a 10-mesh sieve and retained on a 40-mesh sieve. The resulting pulp is stable and has a natural appearance and consistency when employed in a syntheic orange juice.

Instead of karaya gum, tragacanth gum may be used in carrying out the procedure of Example 9.

The pulps of Examples 1 to 9, which examples are based on the use of algin or pectic acid, are appropriate for use in a synthetic juice such as a synthetic citrus fruit juice at a pH of about 3 to about 3.5 and in which the content of soluble calcium is about 0.36% based on the weight of the concentrate. The pulps of these examples are especially suitable for use in a synthetic juice concentrate in dry particulate form.

When the pulp contains a potassium insolubilizable water soluble gum in addition to a calcium insoluble gum and it is desired to insolubilize the potassium insolubilizable gum, then the synthetic juice preferably contains about 1.2% of a soluble potassium compound based on the weight of the concentrate. Examples 10 to 13 which follow illustrate the employment of a calcium insolubilizable gum in combination with a potassium insolubilizable gum which, when potassium insolubilized, functions as a substantially cold water insoluble cold water swelling gum in modifying the insolubilized algin so as to provide a desirable synthetic pulp.

EXAMPLE 10

Algin, carrageenan—coprecipitated 5 parts of 50-centipoise algin and 5 parts of carrageenan are taken into 1000 parts of cold water. The solution is coagulated in an equal volume of 85% isopropyl alcohol containing 2 parts of calcium chloride and 1 part of potassium chloride. During coagulation the precipitate is carefully agitated to obtain the proper pulp size of about ¼″ to ½″ length. The pulp is removed from the liquid and again placed in 1000 mls. of 85% isopropyl alcohol to partially dehydrate. The liquid is removed after about ½ hour, and the pulp dehydrated with several portions of 99% alcohol, or until a dried portion shows a 20–30 second hydration time in the synthetic juice in which it is to be used.

EXAMPLE 11

Algin, hypnea—coprecipitated 1 part of hypnea and 1 part of 50-centipoise algin are taken into 100 parts of water. This is coagulated with proper agitation in the same volume of 85% isopropyl alcohol containing 0.5 part of calcium chloride. The pulp is broken into approximately ½″ long fibers. The pulp is drained and pressed to remove excess liquid, then placed in enough 99% alcohol to cover its surface. It is allowed to set for at least ½ hour, then separated and given more dehydrating washes if necessary until it can be dehydrated in 20–30 seconds in the juice in which it is to be used.

EXAMPLE 12

Algin, hypnea—roll dried

A solution of the same composition and concentration of constituents as in Example 11 may be roll dried and cut to pass a 10- to 40-mesh standard testing screen.

EXAMPLE 13

Algin, hypnea—coprecipitated 1 part of 50 centipoise algin and 2 parts of hypnea are taken in 150 parts of water. This is coagulated in 1 volume of 85% isopropyl alcohol containing 0.5 part of $CaCl_2$. Agitation is carried out to break the coagulum into ¼″ to ½″ fibers. The pulp is then drained and placed in the same volume of 85% isopropyl alcohol for ½ hour, drained and given a series of 99% alcohol washes to remove water. The washing is discontinued when a small dried sample passes the 20–30 second hydration test period in the synthetic juice in which it is to be employed. The total run is processed and screened to pass a 10-mesh standard sieve and retained on a 40-mesh sieve.

As aforesaid, it is not essential when employing a potassium insolubilizable water soluble gum in combination with a calcium insolubilizable gum such as algin and pectic acid to insolubilize the potassium insolubilizable gum either during the making of the pulp or in the synthetic juice. In fact, for use in a synthetic juice preparation of the aqueous concentrate type it usually is preferable not to insolubilize the potassium insolubilizable gum, the potassium insolubilizable gum in such case merely serving as a calcium insensitive cold water soluble gum that has been caused to become coalesced with the calcium insolubilizable gum. The pulps prepared according to Examples 11 to 13 may be employed in this way and this also is the case as regards Example 10 if the potassium chloride is omitted from the alcohol and to coagulate the solution of algin and carrageenan. Examples 14 to 17 provide further illustrations of a pulp wherein the modifying substance for the calcium insolubilizable gum is a calcium-insensitive water soluble gum.

EXAMPLE 14

Algin, carrageenan—coprecipitated 4 parts of 50-centipoise algin and 1 part of carrageenan are taken up in 350 parts of water. The paste is added slowly to 412 parts by weight of 85% isopropyl alcohol under agitation. The coagulating alcohol contains 1 part by weight of $CaCl_2 \cdot 2H_2O$. Agitation is carried out vigorously enough to form ¼″ to ½″ length pulp. After formation the pulp is removed to 412 parts of 85% isopropyl alcohol to further dehydrate the pulp. The pulp is allowed to set for half an hour, then removed to 200 parts of 99% alcohol to dehydrate further. A small portion of pulp is completely dried and tested in a reconstituted synthetic orange drink until it hydrates in 20–30 seconds. Further 99% alcohol treatment of the pulp is carried out if necessary. The final dried pulp is screened to recover particles passing 10-mesh and retained on 40-mesh.

EXAMPLE 15

Algin, degraded amylopectin, casein—coprecipitated 1 part of 50-centipoise algin, 1 part of amylopectin (Kolsol) and 0.1 part casein are taken into 100 parts of water and coagulated by adding slowly to 123 parts of 85% isopropyl alcohol containing ½ part $CaCl_2 \cdot 2H_2O$, and agitated to form ¼″ to ½″ pulp. The pulp is removed to 123 parts of 85% isopropyl alcohol and allowed to dehydrate for half an hour. The pulp is then removed to 60 parts of 99% alcohol and allowed to further dehydrate. Further 99% alcohol treatments are given, if necessary, to produce a dried pulp which reconstitutes in 20–30 seconds when placed in a synthetic orange juice. The final dried pulp is screened to recover particles passing 10-mesh and retained on 40-mesh.

EXAMPLE 16

Algin, degraded amylopectin—coprecipitated 1 part of 50-centipoise algin and 2 parts of degraded amylopectin (Kolsol) are taken in 150 parts of water. The paste is poured slowly into 185 parts of 85% isopropyl alcohol containing 4.2 parts $CaCl_2 \cdot 2H_2O$. Agitation is carried out to form ¼″ to ½″ pulp. The pulp is added to 185 parts of 85% alcohol (which contains .0215 part of 1:1 #5 and #6 food color). The pulp is allowed to set for half an hour, then removed to 50 parts of 99% alcohol for further dehydration. A small portion is completely dried and tested for 20–30 seconds' hydration time in synthetic orange drink. Dehydrate further if necessary. Dry the pulp and screen to recover particles passing 10-mesh and retained on 40-mesh. This example illustrates the inclusion in the synthetic pulp particles of a bromatological coloring agent whenever it may be considered desirable to do so. The pulps of the other examples herein could include a coloring agent if desired.

EXAMPLE 17

Algin, degraded amylopectin—coprecipitated

Example 16 was repeated except that 2 parts of algin and 1 part of amylopectin (Kolsol) were used.

EXAMPLE 18

Algin, guar—coprecipitated 1 part of 50-centipoise algin and 1 part of guar gum are taken into 100 parts of water. The paste is added slowly to 82.4 parts by weight of 85% isopropyl alcohol under agitation. The coagulating alcohol contains 0.5 part by weight of $CaCl_2 \cdot 2H_2O$. The formed pulp is separated from the liquid and added directly to 200 parts 99% alcohol for dehydration. The dehydration is continued until a small portion, completely dried, hydrates in 20–30 seconds in a reconstituted synthetic orange juice.

EXAMPLE 19

Algin, gum acacia, guar—coprecipitated 1 part of 50-centipoise algin, 3 parts acacia and 0.1 part guar (for color retention) are taken into 200 parts of water. The paste is added slowly to 164 parts of 85% isopropyl alcohol containing 2 parts of $CaCl_2 \cdot 2H_2O$. The formed pulp is separated from the liquid and placed in 200 parts of 99% isopropyl alcohol for dehydration. The dehydration is continued until a small portion, completely dried, hydrates in 20–30 seconds in a reconstituted synthetic orange drink.

EXAMPLE 20

Algin, methylcellulose, guar—coprecipitated 1 part of 50-centipoise algin, 3 parts of 100 C.P. Methocel and 0.1 part of guar are taken in 200 parts of water. The paste is added slowly to 164 parts of 85% isopropyl alcohol containing 2 parts of $CaCl_2 \cdot 2H_2O$. The formed pulp is separated from the liquid and placed in 200 parts of 99% isopropyl alcohol for dehydration. The dehydration is continued until a small portion, completely dried, hydrates in 20–30 seconds in a reconstituted synthetic orange drink.

When a water soluble gum is used as a modifying substance as illustrated in the preceding examples, the coalescence of the water soluble gum with the insolubilizable gum seems to promote the occurrence of the particles so as to possess natural pulp-like physical characteristics when dispersed in a juice. These pulp-like physical characteristics are retained even though when the formed particles become dispersed in an aqueous medium most or all of the water soluble gum may become redissolved and dispersed in the aqueous medium.

Examples 21 to 24 which follow are illustrative of the preparation of a synthetic pulp wherein the coalescence is accomplished by film coagulation for the production of thin particles especially suitable for use in a synthetic juice of the aqueous concentrate type.

EXAMPLE 21

Algin, degraded amylopectin—film coagulated 1 part of 50-centipoise algin and 1.5 parts of degraded amylopectin (Kolsol) were taken up in water to provide a paste containing 2% by weight of dissolved solids. The paste was disposed as a thin film on the surface of a drum which carried the film into a bath of 85% isopropanol containing from about 2.5 to 6 grams of calcium chloride per liter. The coagulated film is subjected to grooving or cutting prior to removal. The cutting enables the pulp to break into the proper size of ¼″ to ½″ length. The pulp is removed by a doctor blade into 200 parts by weight of 85% alcohol (to color, contains .017 part 1:1 #5 and #6 food color). Allow the pulp to remain half an hour, then remove to 100 parts of 99% isopropyl alcohol. A portion is dried and tested for 20–30 seconds' hydration time in a reconstituted synthetic orange drink. Continue 99% alcohol treatment until acceptable. Dry and screen the pulp to recover particles passing 10-mesh and retained on 40-mesh.

EXAMPLE 22

Algin, degraded amylopectin, casein—film coagulated

The procedure of Example 21 was followed except that 0.5 part of casein also was included in the paste.

EXAMPLE 23

Algin, carrageenan—film coagulated

The procedure of Example 21 was followed except that the pulp formulation consisted of 1 part of algin and 1 part of soluble carrageenan.

EXAMPLE 24

Algin, carboxymethyl cellulose—film coagulated

The procedure of Example 21 was followed except that the pulp formulation consisted of 3 parts of algin and 1 part of carboxymethyl cellulose.

The employment of a potassium insolubilizable gum as the sole water soluble gum is illustrated in Examples 25 and 26 which follow. A gum of this kind is to be used in a synthetic juice containing sufficient potassium to insolubilize the gum or so as to maintain it in the insolubilized state if it already is insolubilized when added to the synthetic juice.

EXAMPLE 25

Hypnea, starch—coprecipitated 5 parts of hypnea and 5 parts of starch that does not swell in cold water are mixed with 500 parts of cold water. The paste is coagulated with an equal volume of 85% isopropyl alcohol containing 5 parts of potassium chloride, part of which is in solution and part undissolved until the paste is added. Careful agitation is carried out to form ¼″ to ½″ length pulp. The liquid is drained off and the pulp is placed in 500 mls. of 85% isopropyl alcohol. The pulp is allowed to set for about half an hour, then drained and dehydrated with 99% isopropyl alcohol until a small dried portion hydrates in 20–30 seconds in the juice in which it is to be used.

EXAMPLE 26

Furcellaria, starch—coprecipitated

The procedure of this example is that of Example 25 except for the employment of furcellaria instead of hypnea.

A synthetic juice such as synthetic orange juice frequently is sold in the form of a frozen paste concentrate which, when it is to be consumed, is diluted with about 3 parts of water per part paste. In one such commercial product the amount of soluble calcium in the concentrate is approximately 0.16%. Synthetic orange juice also is widely sold in the form of a soluble powder which is made ready for consumption merely by dissolving sufficient thereof in cold water to provide the desired concentration. In one such commercial dry powder product the amount of soluble calcium is approximately 0.36%. In either case, when the concentrated preparation is made up at a concentration at which the juice usually is consumed the concentration of soluble calcium (as calcium) is from about 0.032% to about 0.047% by weight. Larger amounts may be present but are unnecessary. The soluble calcium can be supplied by an bromatological calcium compound of sufficient solubility such as calcium citrate, calcium sulfate, calcium phosphate and calcium chloride.

If the pulp comprises a potassium insolubilizable water soluble gum, then a bromatological salt of potassium should be included in the synthetic juice or juice concentrate so as to provide in the juice as prepared for consumption about 0.12% to about 0.15% of potassium (as potassium). Potassium citrate normally is used but other salts of potassium may be employed such as potassium sulfate, potassium chloride and potassium phosphate.

When soy bean flour is employed as a modifying substance, the protein content thereof is sufficient to promote the absorption of color by the synthetic pulp particles. The amount of protein required for this purpose is small, namely, from about 1% to about 5% of the dry weight of the pulp. If the protein is not otherwise contained in the pulp a suitable protein may be added, such as casein.

The concentration of the solution of the insolubilizable water soluble gum in which the modifying substance is dispersed prior to coalescence is not critical. Due to the high viscosity of water solutions of the water soluble gums and the pronounced swelling properties of insoluble cold water swelling gums, the solution usually contains from about 0.4% to about 1.6% by weight of the insolubilizable water soluble gum and the total solids content (the combined dry weight of both the insolubilizable water soluble gum and the modifying substance) is about 2% to about 8% of the solution. More generally, sufficient water is present to permit thorough dispersion of the modifying substance in the solution while avoiding any unnecessary excess that would render less efficient the steps for accomplishing the coalescence of the modifying substance with the water soluble gum.

A commercial synthetic composition which is produced in a dry particulate form and is readily soluble in water to provide a synthetic orange juice is sold under the trade name "Tang." The composition of this synthetic orange juice provides an example of a synthetic juice with which the synthetic pulp of this invention may be employed. The ingredients of this particular synthetic orange juice are sugar, citric acid, sodium citrate, calcium phosphate, gum arabic, sodium carboxymethyl cellulose, hydrogenated vegetable oil, orange flavor, vitamins A and C, artificial color, and a preservative. The recommended dilution for consumption is about 2 heaping teaspoonfuls per ½ cup of water. In a synthetic juice such as above exemplified the synthetic pulp of this invention may constitute about 1% on the dry weight of the solids. When the particles of the synthetic juice comprising the synthetic pulp particles are dispersed in water, the soluble ingredients quickly dissolve and the synthetic pulp particles hydrate in about 20–30 seconds to produce synthetic pulp which closely resembles the natural pulp in freshly prepared orange juice as regards appearance, texture and mouth feel. The pulp also possesses stability in the juice corresponding to the stability of natural pulp.

As aforesaid, the synthetic pulp of this invention also may be utilized with similar advantages as the pulp component of a juice concentrate of the frozen type that is diluted with water when it is to be consumed, although for optimum results in a product of this type the formulations and production of the pulp may differ in some respects from that which provide the optimum results in the case of a preparation in dry particulate form. It is one of the advantages of this invention that the pulp characteristics for a particular product can be controlled as desired in accordance with the principles that have been described hereinabove.

While the synthetic pulp of this invention may be employed in a synthetic juice, it may be employed as the pulp component of concentrated natural juice. The concentration of natural juice usually is effected after having removed the pulp. The preservation of the removed natural pulp and its reintroduction in the concentrated juice requires substantial expense and processing equipment that can be avoided by utilizing the relatively inexpensive synthetic pulp of this invention. The synthetic pulp also lends itself to being used as the pulp component of any synthetic or natural juice product.

What is claimed is:

1. A synthetic juice pulp in the form of discrete particles composed of material which material comprises (1) a water soluble gum which is insolubilizable by a cation selected from the group consisting of calcium and potassium, and (2) a modifying substance and which material is produced in the solid state with said modifying substance intimately coalesced with said water soluble gum from an aqueous solution of said gum containing said substance dispersed therein by coagulation of said gum from residual solution with coprecipitation of said substance with the coagulated gum or by drying said solution, said modifying substance being selected from the group consisting of cold water soluble and cold water insoluble cold water swelling gums that are substantially insensitive to said cation, carbohydrate flours and soy bean flour.

2. A particulate synthetic juice pulp according to claim 1 wherein said insolubilizable gum is in the insolubilized state and constitute from about 5% to about 90% by dry weight of the pulp particles.

3. A synthetic juice pulp according to claim 1 which contains a minor amount of protein and an edible coloring agent.

4. A synthetic juice pulp in the form of discrete particles composed of material which comprises from about 5% to about 90% by dry weight of an insolubilized water soluble gum selected from the group consisting of algin insolubilized by calcium, pectic substances insolubilized by calcium, kappa carrageenan insolubilized by potassium, hypnea insolubilized by potassium and furcellaria insolubilized by potassium, and at least about 10% by weight of a modifying substance and which is produced in the solid state with said modifying substance intimately coalesced with said water soluble gum from an aqueous solution of said gum containing said substance dispersed therein by coagulation of said gum from residual solution with coprecipitation of said substance with the coagula of said gum or by drying said solution, said modifying substance being selected from the group consisting of cold water soluble and cold water insoluble cold water swelling gums that are substantially insensitive to the aforesaid insolubilizing cations, carbohydrate flours and soy bean flour.

5. A synthetic juice pulp in the form of discrete particles composed of material which material comprises (1) a calcium insolubilizable gum selected from the group consisting of algin and pectic substances, and (2) a modifying gum selected from the group consisting of cold water soluble and cold water insoluble cold water swelling gums that are substantially insensitive to calcium and which material is produced in the solid state with said modifying gum intimately coalesced with said calcium insolubilizable gum from an aqueous solution of said calcium insolubilizable gum containing said modifying gum dispersed therein by coagulation of said calcium insolubilizable gum from residual solution with coprecipitation of said modifying gum with the coagula of said calcium insolubilizable gum or by drying said solution.

6. A partculate synthetic juice pulp according to claim 5 wherein said calcium insolubilizable gum occurs insolubilized by calcium and wherein said calcium insolubilizable gum constitutes a minor proportion by dry weight of the material of which said pulp is composed.

7. A particulate synthetic juice pulp, the particles of which comprise in intimately coalesced relation (1) a calcium insolubilizable water soluble gum selected from the group consisting of algin and pectic substances, (2) a gum selected from the group consisting of cold water soluble and cold water insoluble cold water swelling gums that are substantially insensitive to calcium, and (3) a substantially water insoluble substantially non-swelling flour selected from the group consisting of carbohydrate flours and soy bean flour.

8. A particulate synthetic juice pulp, the particles of which comprise in intimately coalesced relation (1) a calcium insolubilizable water soluble gum selected from the group consisting of algin and pectic substances, and (2) a potassium insolubilizable water soluble gum selected from the group consisting of kappa carrageenan, hypnea and furcellaria, said calcium insolubilizable gum occurring insolubilized by calcium and said potassium insolubilizable gum occurring insolubilized by potassium.

9. A dry solid synthetic composition dispersible in water to provide a synthetic juice, said composition containing a particulate synthetic readily-hydratable pulp, the particles of which comprise a calcium insolubilizable gum selected from the group consisting of algin and pectic substances and a substantially calcium-insensitive gum selected from the group consisting of cold water soluble and cold water insoluble cold water swelling gums in intimately commingled relation with said calcium insolubilizable gum, said composition having an acid pH and containing an edible soluble compound of calcium which provides a concentration of calcium cations effective for insolubilizing said calcium insolubilizable gum when said composition is dispersed in water to provide a juice.

10. A composition according to claim 9 wherein said particles also comprise a substantially water insoluble substantially non-swelling flour selected from the group consisting of carbohydrate flours and soy bean flour.

11. A dry solid synthetic composition according to claim 9 wherein said particles also comprise in intimately commingled relation with said calcium insolubilizable gum a potassium insolubilizable gum selected from the group consisting of kappa carrageenan, hypnea and furcellaria and an edible soluble compound of potassium which provides a concentration of potassium cations effective for insolubilizing said potassium insolubilizable gum when said composition is dispersed in water to form a juice.

12. A flavored aqueous synthetic juice containing a particulate synthetic pulp dispersed therein, said juice having a pH between about 3.0 and about 3.5 and containing calcium cationically dispersed therein, and the particles of said synthetic pulp comprising the product of (a) effecting coalescence from the dissolved state in mutual solution to the solid state of a mixture of (1) a calcium insolubilizable gum selected from the group consisting of algin and pectic substances, and (2) a modifying water soluble gum that is substantially insensitive to calcium, (b) effecting calcium insolubilization of said calcium insolubilizable gum contained in the coalesced mixture by contacting said coalesced mixture with an aqueous medium containing calcium cations, (c) producing said coalesced mixture in the form of discrete particles, and (d) removing from said particles a substantial amount of said modifying gum by its dissolution in an aqueous medium.

13. A synthetic juice according to claim 12 wherein said particles also comprise in intimately coalesced relation with said insolubilized gum a water insoluble substantially non-swelling flour selected from the group consisting of carbohydrate flours and soy bean flour.

14. A method of producing an artificial juice pulp which comprises dissolving in water a water soluble gum that is insolubilizable responsive to a metal occurring as cations selected from the group consisting of calcium and potassium, dispersing in said water an edible modifying substance, which said modifying substance is dispersed in said solution converting said water soluble gum to the solid state in intimately coalesced relation with said substance by coagulation of said gum from said solution with coprecipitation of said substance with the coagulated gum or by drying said solution, and while said gum is in intimately coalesced relation with said substance insolubilizing said gum responsive to said metal occurring as cations.

15. A method of producing an artificial juice pulp which comprises dissolving in water a calcium insolubilizable water soluble gum selected from the group consisting of algin and pectic substances, dispersing in said water containing said dissolved gum a modifying gum selected from the group consisting of water soluble gums and substantially cold water insoluble cold water swelling gums, said modifying gum being substantially insensitive to calcium, converting said dissolved calcium insolubilizable gum to the solid state with said modifying gum intimately coalesced therewith by coagulation of said calcium insolubilizable water soluble gum from residual with coprecipitation of said modifying gum with the coagulated gum or by drying said solution and while said modifying gum is intimately coalesced with said calcium insolubilizable water soluble gum insolubilizing said calcium insolubilizable water soluble gum responsive to calcium occurring as a cation.

16. A method of producing an artificial juice pulp which comprises dissolving in water a calcium insolubilizable water soluble gum selected from the group consisting of algin and pectic substances, dispersing a modifying substance in said solution of said gum, coagulating said gum with said substance in intimately coalesced relation therewith by mixing a volatile hydrophilic liquid therewith, and washing the resulting coagulum with hydrophilic liquid to dehydrate the particles of said coagulum.

17. A method according to claim 16 wherein said hydrophilic liquid is a hydrophilic alcohol of at least 85% concentration.

18. A method of producing an artificial juice pulp which comprises dissolving in water a water soluble gum that is insolubilizable responsive to a metal occurring as cations selected from the group consisting of calcium and potassium, dispersing in said solution an edible modifying substance, while said modifying substance is dispersed in said solution distributing said solution in the form of a film on a supporting surface, contacting said film while carried by said supporting surface with a bath effective to insolubilize said gum and solidify said film with said modifying substance in intimately coalesced relation with the insolubilized gum, and removing the solidified film from said surface.

19. A method according to claim 18 wherein said film is cut into pieces of a predetermined size while the solidified film is carried on said surface.

20. A method of producing an artificial juice pulp which comprises dissolving in water a calcium insolubilizable water soluble gum selected from the group consisting of algin and pectic substances, dispersing in said water containing said dissolved gum a modifying gum selected from the group consisting of water soluble gums and substantially cold water insoluble cold water swelling gums, said modifying gum being substantially insensitive to calcium, distributing said solution on a carrying surface in the form of a film, solidifying said film while carried on said surface by contact with a bath containing cationically dispersed calcium effective to insolubilize said gum, and thereafter removing the solidified film from said surface and reducing it to a particulate condition.

21. A method of producing a synthetic juice pulp wherein a water soluble gum that is insolubilizable responsive to a metal occurring as cations selected from the group consisting of calcium and potassium is dissolved in water, a modifying substance is dispersed in the resulting solution and said insolubilizable gum is converted to the solid state with said modifying substance in intimately coalesced relation therein, said method comprising converting solution constituted as aforesaid to the solid state by drying on the surface of a heated drum followed by its recovery in dry particulate form, converting another quantity of solution constituted as aforesaid to to solid state by coagulation with a hydrophilic liquid followed by its recovery in dry particulate form, and making a blend of particles produced by said drum-drying step with particles produced by said coagulation step.

22. A particulate synthetic juice pulp, the particles of which comprise in intimately coalesced relation (1) a potassium insolubilizable gum selected from the group consisting of kappa carrageenan, hypnea and furcellaria and (2) a substantially water insoluble substantially non-swelling flour selected from the group consisting of carbohydrate flours and soy bean flour.

23. A flavored aqueous synthetic juice containing a particulate synthetic pulp dispersed therein, said juice having a pH between about 3.0 and about 3.5 and containing potassium cationically dispersed therein and the particles of said synthetic pulp comprising in intimately coalesced relation (1) a gum selected from the group consisting of kappa carrageenan, hypnea and furcellaria insolubilized responsive to said cationically dispersed potassium and (2) an edible substantially water insoluble substantially non-swelling flour selected from the group consisting of carbohydrate flours and soy bean flour.

24. A method of producing an artificial juice pulp which comprises dissolving in water a potassium insolubilizable water soluble gum selected from the group consisting of carrageenan, hypnea and furcellaria, dispersing in said water containing said dissolved gum a substantially water insoluble substantially non-swelling flour selected from the group consisting of carbohydrate flours and soy bean flours, converting said gum to the solid state with said flour intimately coalesced therewith and while said flour is intimately coalesced with said gum insolubilizing said gum responsive to potassium occurring as a cation.

25. A method according to claim 24 wherein said gum is converted to the solid state with said flour intimately coalesced therewith and wherein said gum is insolubilized by adding said solution to a mixture of water and hydrophilic liquid selected from alcohols and acetone that is effective to coagulate said gum, said mixture containing a salt of potassium providing potassium cations effective to insolubilize said gum in the resulting coagula, the resulting coagula thereafter being subjected to controlled agitation to form particles of a predetermined size range simulating juice pulp.

26. A method of producing an artificial juice pulp which comprises dissolving in water a water soluble gum that is insolubilized by a metal occurring as cations selected from the group consisting of calcium and potassium, dispersing in said solution an edible modifying substance, while said modifying substance is dispersed in said solution adding the solution to a mixture of water and a water soluble hydrophilic liquid containing a dissolved salt providing cations selected from the group consisting of calcium and potassium in effective amount to insolubilize said gum thereby coagulating said gum from residual solution with said substance intimately coalesced therewith and insolubilizing the gum in the resulting coagula, subjecting the residual solution containing said coagula to controlled agitation to break up the coagula into particles of a predetermined size range, and separating the particles from residual solution.

27. A method according to claim 26 wherein said hydrophilic liquid is selected from the group consisting of alcohols and acetone, wherein the particles after separation from the residual solution are dehydrated by contact with a hydrophilic liquid selected from alcohols and acetone, and wherein the particles are separated from said hydrophilic liquid and dried.

28. A flavored aqueous synthetic juice containing particulate synthetic pulp dispersed therein, the particles of said pulp comprising in intimately coalesced relation an insolubilized gum selected from the group consisting of algin insolubilized by calcium, pectic substances insolubilized by calcium, kappa carrageenan insolubilized by potassium, hypnea insolubilized by potassium and furcellaria insolubilized by potassium and at least 10% by dry weight of a modifying substance intimately coalesced with the insolubilized gum, said modifying substance being selected from the group consisting of cold water soluble gums and cold water insoluble cold water swelling gums that are substantially insensitive to said insolubilizing cations, carbohydrate flours and soy bean flour.

29. A method of making an edible juice containing synthetic juice pulp distributed therein in the form of discrete particles which comprises:
(a) forming an aqueous solution of a water soluble gum which is insolubilizable by a cation selected from the group potassium and calcium, said solution containing dispersed therein a modifying substance selected from the group consisting of cold water soluble and cold water insoluble cold water swelling gums that are substantially insensitive to said cations, carbohydrate flours and soy bean flour;
(b) reducing said water soluble insolubilizable gum to the solid state with said modifying substance intimately coalesced therewith by coagulation of said gum from said solution with coprecipitation of said modifying substance with the coagulated gum or by drying said solution;
(c) producing the solidified gum with said substance coalesced therewith in the form of particles within a predetermined size range;
(d) commingling said particles in discrete form with said juice; and
(e) insolubilizing said water soluble insolubilizable gum comprised in said particles by contacting it with a cation selected from the group calcium and potassium contained in an aqueous medium.

30. A synthetic juice pulp according to claim 4 wherein said cold water soluble gum is a gum selected from the group consisting of soluble carrageenan, degraded amylopectin, carboxymethyl cellulose, guar, gum acacia and methyl cellulose and wherein said cold water insoluble cold water swelling gum is selected from the group consisting of karaya, tragacanth, locust bean, tamarind, agar, lime-extracted *Eucheuma spinosum*, gelatinized starch and gelatinized wheat flour.

References Cited
UNITED STATES PATENTS

| | | | |
|---|---|---|---|
| 2,701,767 | 2/1955 | Twieg | 99—132 |
| 2,935,408 | 5/1960 | Steinitz | 99—131 XR |
| 3,085,015 | 4/1963 | Schram | 99—131 XR |
| 3,352,688 | 11/1967 | Messina | 99—131 |
| 3,362,831 | 1/1968 | Szczesniak | 99—131 |

A. LOUIS MONACELL, *Primary Examiner.*

J. M. HUNTER, *Assistant Examiner.*

U.S. Cl. X.R.

99—131, 132, 28

PO-1050
(5/69)

UNITED STATES PATENT OFFICE
CERTIFICATE OF CORRECTION

Patent No. 3,446,625          Dated May 27, 1969

Inventor(s) John Blethen

It is certified that error appears in the above-identified patent and that said Letters Patent are hereby corrected as shown below:

Col. 13, line 15, "dehydrated" should read --rehydrated--,

Col. 16, line 31, "an" should read --any--.

Col. 19, line 43, after "residual" insert --solution--.

Col. 20, line 30, "to" should read --the--.

SIGNED AND
SEALED
JAN 27 1970

(SEAL)
Attest:

Edward M. Fletcher, Jr.
Attesting Officer

WILLIAM E. SCHUYLER, JR.
Commissioner of Patents